United States Patent
De Wolf et al.

(10) Patent No.: US 12,365,757 B2
(45) Date of Patent: Jul. 22, 2025

(54) NON-AQUEOUS CROSSLINKABLE COMPOSITION WITH IMPROVED APPEARANCE

(71) Applicant: ALLNEX NETHERLANDS BV, Ab Bergen op Zoom (NL)

(72) Inventors: Elwin De Wolf, PP Hoogerheide (NL); Marinus Goedegebuure, Sint-Annaland (NL)

(73) Assignee: ALLNEX NETHERLANDS BV, Bergen op Zoom (NL)

( * ) Notice: Subject to any disclaimer, the term of this patent is extended or adjusted under 35 U.S.C. 154(b) by 408 days.

(21) Appl. No.: 17/285,018

(22) PCT Filed: Nov. 5, 2019

(86) PCT No.: PCT/EP2019/080228
§ 371 (c)(1),
(2) Date: Apr. 13, 2021

(87) PCT Pub. No.: WO2020/094636
PCT Pub. Date: May 14, 2020

(65) Prior Publication Data
US 2021/0292465 A1 Sep. 23, 2021

(30) Foreign Application Priority Data

Nov. 6, 2018 (EP) .................... 18204610

(51) Int. Cl.
*C08G 18/62* (2006.01)
*B05D 7/00* (2006.01)
*C08G 18/28* (2006.01)
*C08G 18/73* (2006.01)
*C09D 175/06* (2006.01)

(52) U.S. Cl.
CPC ......... *C08G 18/6229* (2013.01); *B05D 7/572* (2013.01); *B05D 7/574* (2013.01); *C08G 18/2865* (2013.01); *C08G 18/73* (2013.01); *C09D 175/06* (2013.01)

(58) Field of Classification Search
CPC ........ C08G 18/6229; C08G 18/2865; C08G 18/73; B05D 7/572; B05D 7/574; C09D 175/06
See application file for complete search history.

(56) References Cited

U.S. PATENT DOCUMENTS

| | | | |
|---|---|---|---|
| 4,311,622 A | 1/1982 | Buter | |
| 4,528,319 A | 7/1985 | Ottaviani et al. | |
| 5,214,086 A | 5/1993 | Mormile et al. | |
| 8,148,460 B2 | 4/2012 | Alpert et al. | |
| 8,207,268 B2 | 6/2012 | Brinkhuis | |
| 9,617,448 B2 | 4/2017 | Weiher et al. | |
| 2007/0203268 A1* | 8/2007 | Alpert | C09K 3/10 524/104 |
| 2008/0146720 A1 | 6/2008 | Brinkhuis et al. | |
| 2011/0059252 A1* | 3/2011 | Paquet, Jr. | C09D 133/04 427/384 |
| 2012/0226075 A1* | 9/2012 | Leutfeld | C08G 18/706 564/59 |
| 2014/0378587 A1* | 12/2014 | Weiher | B05D 3/02 524/211 |
| 2015/0299502 A1 | 10/2015 | Thomas et al. | |
| 2018/0187045 A1* | 7/2018 | Mathieu | C08G 18/73 |

FOREIGN PATENT DOCUMENTS

| | | | | |
|---|---|---|---|---|
| DE | 19725188 A1 * | 6/1998 | ......... | C08G 18/7893 |
| EP | 0 192 304 | 8/1986 | | |
| JP | 11-506477 | 6/1999 | | |
| JP | 2015-511974 | 4/2015 | | |
| WO | 96/34924 | 11/1996 | | |
| WO | 98/16583 | 4/1998 | | |
| WO | 2007/020269 | 2/2007 | | |
| WO | WO-2016202601 A1 * | 12/2016 | ........... | C08G 18/163 |

OTHER PUBLICATIONS

Bartol DE19725188A1 (trans.) (Year: 1998).*
International Search Report (ISR) issued Jan. 27, 2020 in International (PCT) Application No. PCT/EP2019/080228.

* cited by examiner

*Primary Examiner* — Robert C Boyle
(74) *Attorney, Agent, or Firm* — Wenderoth, Lind & Ponack, L.L.P.

(57) ABSTRACT

The present invention relates to a polyol component comprising a1) a polyol having a weight averaged molecular weight Mw of from 1,000 to 4,000 Dalton, a number averaged molecular weight Mn of from 600 to 2,500 Dalton, an OH value between 80 and 300 mg KOH/g of resin and a glass transition temperature Tg of from −10 to 90° C., and a2) between 0.1 and 10% by weight of polyurea product as rheological agent, as well as it use in a crosslinkable composition especially suitable for clear coat applications.

16 Claims, No Drawings

NON-AQUEOUS CROSSLINKABLE COMPOSITION WITH IMPROVED APPEARANCE

The invention relates to a crosslinkable composition with improved appearance and lower VOC comprising a polyol having free hydroxyl groups that can react with a crosslinker and optionally a catalyst catalysing this reaction and a polyurea rheological agent and its use in coatings.

For OEM clear coatings, the control of flow behavior, i.e., the competing processes of sagging and leveling, is probably the most important and the most difficult aspect of their formulation. The problem is particularly acute when the paint is to be sprayed onto a vertically oriented surface. Coatings must be able to level in order to minimize surface irregularities or waviness resulting in worse appearance and to develop the necessary appearance properties required of an automotive finish. During this time, sagging will occur. Since factors that govern sagging and leveling necessarily oppose each other, designing a system with complete leveling will result in severe sagging, whereas complete sag control results in hardly any leveling. Consequently, a compromise must be made by balancing those factors that affect sagging and leveling. Usually, rheological agents, especially rheological agents based on a polyurea product, are used to aid finding the balance. Polyurea based rheological agents and their use in polyols have for example been described in EP0192304, U.S. Pat. Nos. 4,851,294, 4,311,622 and US20140378587.

Levelling and increasingly improved appearance are of the highest importance in today's automotive OEM market. Not only are the specifications for clearcoat coatings more and more stringent, also increasingly, more rough and less expensive substrates are being used. In addition, flash and drying times of the non-clearcoat layers are reduced with the consequence that optimal levelling is often not achieved. Therefore, it is increasingly important that the clearcoat coating composition also has the property to hide the roughness of the metal substrate. It is known from US20080146720 and BASF handbook on Basics of Coating technology, page 333-334, that the more shrinkage of the clearcoat, the more pronounced this transfer of the substrate roughness may be. A solution to decrease the shrinkage would be to increase the solid content of the formulation. This is well-known in radiation curable coating formulations. However, for temperature curing sprayable formulations, this is less obvious. Increasing the solid content and formulate a high solids clearcoat composition could be achieved by reducing the molecular weight of the binder. However, a lower molecular weight will result in a lower binder Tg if the binder Tg is not compensated for with more expensive, harder monomers. Consequently, lowering the molecular weight will severely affect the coating performance (Epple & Vogel, European Coating Journal, 07-08/2005, page 49). In addition, a lower molecular weight will also result in a lower viscosity of the binder, consequently giving more sagging. Some high solids clearcoat coatings comprising urea based rheological agents have been described before.

U.S. Pat. No. 4,528,319 describes a high solids sprayable clearcoat comprising a urethane binder, a melamine hardener and a flow control system consisting of a urethane-urea polymer and silica particles. However, sagging data shown in FIG. 1 of this patent indicate that these coatings do not provide the sagging behavior and an acceptable balance according to today's standards.

U.S. Pat. No. 8,148,460 describes a high solid clearcoat comprising a rheological agent based on benzyl amine and hexamethylenediisocyanate in the presence of a bismuth catalyst. Although no data are presented, it was claimed that the formulation provided a good balance. However, it was necessary to bake the composition at 130° C. for 45 minutes, which is unacceptable according to today's standards.

U.S. Pat. No. 8,207,268 and WO2006/074895 disclose clearcoat coatings formulated at high solids comprising polyurea based rheological agents. However, at this solid content, the viscosity was too high for spray application, enabling draw-down application only. Furthermore, the formulation did not provide the good balance as expected.

Therefore, there is a clear need for a clearcoat composition, especially a high solids or low VOC composition, providing improved levelling and appearance, excellent sag resistance and well-balanced other relevant coatings properties such as hardness, chemical resistance, flexibility and durability.

Applicants have found polyol components and coating compositions that overcome the drawbacks of previously described compositions and that provide the combination of properties as here above described. Therefore the present invention relates to a polyol component comprising a) at least 35% by weight of a polyol a1) having a weight averaged molecular weight Mw of from 1,000 to 4,000 Dalton, a number averaged molecular weight Mn of from 600 to 2,500 Dalton, an hydroxyl value (OH value) between 80 and 300 mg KOH/g of resin and a glass transition temperature Tg of from −10 to 90° C., and between 0.1-10% by weight of polyurea product a2) as rheological agent, as well as its use in a crosslinkable composition.

Applicants have found that the use of the specific polyol components according to the invention in crosslinkable coating compositions, especially in high solids or low VOC compositions, enables to provide improved levelling and appearance, excellent sag resistance and well-balanced other relevant coatings properties such as hardness, chemical resistance, flexibility and durability. The present invention therefore also relates to a process wherein a polyol component according to the invention is added in a coating composition or formulation together with at least one other crosslinkable oligomer or polymer and at least one crosslinker.

The present invention hence further relates to a crosslinkable composition comprising
  a) a polyol component comprising
    a1) at least 35% by weight of a polyol a1) having a weight averaged molecular weight Mw of from 1,000 to 4,000 Dalton, a number averaged molecular weight Mn of from 600 to 2,500 Dalton, an OH value between 80 and 300 mg KOH/g of resin and a glass transition temperature Tg of from −10 to 90° C., and
    a2) between 0.1 and 10% by weight of polyurea product a2) as rheological agent
  b) optionally at least one polyol b) which can be the same or different from polyol a1), said polyol b) having at least 2 free-OH (hydroxyl) groups
  c) a crosslinker reactable with polyols a1) and/or b),
  d) optionally a catalyst for catalysing the reaction between-OH groups of said polyol a1) and/or b) and said crosslinker c).

The weight averaged molecular weight Mw and number averaged molecular weight Mn are determined according to ASTM D 3593 by Gel Permeation Chromatography using polystyrene standards, more particularly using size exclusion chromatography.

The Tg is measured using Mettler DSC 822E calorimeter according to DEN EN ISO 16805 and ISO 11357.

The hydroxyl value is measured according to the method ASTM E222-17.

It has been found that the use of such polyol component and crosslinkable composition allows to obtain a coating composition having improved levelling and appearance, while maintaining good sag resistance. The composition is highly suitable to be formulated at a low content of volatile organic components and high solids, particularly at a solid content of higher than 50% by weight. Furthermore, the resulting crosslinked material provides good resistance to chemicals and sunlight, is durable, has good mechanical properties and has an excellent appearance. It is particularly surprising that with this crosslinkable composition good hardness and chemical resistance were obtained despite the low molecular weight of polyol a1) and that the crosslinkable composition provides a better balance between appearance, sag resistance, hardness and chemical resistance.

The composition according to the invention is preferably a so-called non-aqueous composition, generally a composition comprising less than 10% of water, preferably less than 5% of water, more preferably less than 1% of water or even substantially free of water.

The polyol component according to the invention preferably comprises less than 10% of water, more preferably less than 5% of water, most preferably less than 1% of water or is even substantially free of water.

The polyols a1) and b) used in the polyol component and/or composition according to the invention are usually polymers comprising at least 2, preferably more than 2, —OH groups. Preferably polyols a1) and/or b) comprise on average at least 2.2—OH groups, more preferably on average at least 2.5—OH groups. Polyol b) can comprise the same polyol as polyol a1), and/or polyol b) can comprise a polyol which is different compared to the polyol a1).

The polyols a1) and b) are preferably selected from polyester polyols, (meth)acrylic polyols, polycarbonate polyols, polyether polyols, polyurethane polyols, and mixtures and hybrids thereof. Such polymers are generally known to the skilled person and are commercially available.

The polyols a1) are preferably selected from polyester polyols and (meth)acrylic polyols, as well as mixtures and hybrids thereof, as further described here under.

Of the wide variety of potentially suitable polyols a1) and b), preferred are the polyester polyols and (meth)acrylic polyols, hybrids and mixtures thereof. Suitable polyester polyols can be obtained, for instance, by the polycondensation of one or more di- and/or higher functional hydroxy compounds with one or more di- and/or higher functional carboxylic acids, C1-C4 alkyl esters and/or anhydrides thereof, optionally in combination with one or more monofunctional carboxylic acids and/or C1-C4 alkylesters thereof and/or monofunctional hydroxy compounds. Non-limiting examples of monocarboxylic acids are linear or branched alkyl carboxylic acids comprising 4 to 30 carbon atom, such as stearic acid, 2-ethylhexanoic acid and isononanoic acid. As non-limiting examples, di- and/or higher functional hydroxy compounds can be one or more alcohols selected from ethylene glycol, neopentyl glycol, trimethylol propane, trihydroxyethyl isocyanurate and pentaerythritol. As non-limiting examples, the di- and/or higher functional carboxylic acids are one or more selected from the group consisting of adipic acid, 1,4-cyclohexyl dicarboxylic acid, hexahydrophthalic acid, succinic acid, and functional equivalents thereof. Polyester polyols can be prepared from di- and/or higher functional hydroxy compounds and from carboxylic acids, and/or anhydrides and/or C1-C4 alkyl esters of the acids.

Suitable (meth)acrylic polyols can be obtained, for instance, by the (co) polymerization of hydroxy-functional (meth)acrylic monomers with other ethylenically unsaturated comonomers in the presence of a free radical initiator. As a non-limiting example, the (meth)acrylic polyol can include residues formed from the polymerization of one or more hydroxyalkyl esters of (meth)acrylic acid, such as for example hydroxyethyl (meth)acrylate, hydroxypropyl (meth)acrylate, hydroxybutyl (meth)acrylate, polyethylene glycol esters of (meth)acrylic acid, polypropylene glycol esters of (meth)acrylic acid, and mixed polyethylene glycol and polypropylene glycol esters of (meth)acrylic acid. The (meth)acrylic polyol further preferably comprises monomers not containing hydroxyl groups such as methyl (meth)acrylate, tert-butyl (meth)acrylate, isobornyl (meth)acrylate, isobutyl (meth)acrylate, (substituted) cyclohexyl (meth)acrylate, (meth)acrylic acid. The (meth)acrylic polyol optionally comprises non-(meth)acrylate monomers such as styrene, vinyl toluene or other substituted styrene derivatives, vinyl esters of (branched) monocarboxylic acids, maleic acid, fumaric acid, itaconic acid, crotonic acid and monoalkylesters of maleic acid.

The polyol a1) used in the polyol component and composition according to the invention preferably has a weight averaged molecular weight Mw of less than 3,500 Dalton, more preferably less than 3,250, most preferably less than 3,000 Dalton.

The number averaged molecular weight Mn of polyol a1) is preferably lower than 2,000 Dalton.

The polyol a1) used in the present invention preferably has a polydispersity Mw/Mn of higher than 1, more preferably of 1.1 to 6.6, most preferably from 1.4 to 4.

The glass transition temperature Tg of polyol a1) is preferably higher than −5° C. The glass transition temperature of polyol a1) does preferably not exceed 75° C.

The polyol a1) used in the polyol component and composition according to the present invention has a hydroxyl value, as determined according to ASTM E222-17, in the range of 80 to 300 mg KOH per gram of polyol, preferably in the range of 100 to 250 mg KOH per gram of polyol and more preferably preferred in the range of 120 to 180 mg KOH per gram of polyol a1).

The polyol a1) according to the invention can have any acid value. Preferred are polyols a1) having an acid value of less than 20 mg KOH/gram of polyol a1), more preferred of less than 10 mg KOH/gram of polyol a1) and most preferred of less than 8 mg KOH/gram of polyol a1). The acid value can be determined according to ISO 3682-1996.

According to a preferred embodiment of the invention, the polyol a1) is a (meth)acrylic polyol, more particularly a (meth)acrylic polyol having a weight averaged molecular weight Mw of from 1,500 to 4,000 Dalton, more preferably from 1,500 to 3,500 Dalton and, preferably a number averaged molecular weight Mn of from 900 to 2,500 Dalton, more preferably lower than 2,000 Dalton. Such a (meth)acrylic polyol a1) can have any monomer composition. Preferred are (meth)acrylic polyols obtained from:

5 to 50, more preferably from 10 to 40, % by weight of styrene or substituted styrene monomers,
10 to 50, more preferably from 20 to 45, % by weight of hydroxy functional (meth)acrylic monomers,
10 to 70, more preferably from 15 to 60, % by weight of linear or branched alkyl (meth)acrylate monomers with an alkyl group comprising from 1 to 6 carbon atoms 0 to 20% by weight of linear or branched alkyl (meth) acrylate monomers with an alkyl group comprising from 7 to 20 carbon atoms 0 to 5% by weight of (meth)acrylic acid.

All amounts are relative to the total weight of monomers.

According to another preferred embodiment of the invention, the polyol a1) is a polyester polyol having a weight averaged molecular weight Mw of from 1,000 to 3,000 Dalton, more preferably from 1,100 to 2,800 Dalton and, preferably, a number averaged molecular weight Mn of from 600 to 1,500 Dalton, more preferably lower than 1,500 Dalton and most preferably from 650 to 1,400 Dalton. Such a polyester polyol a1) can have any monomer composition. Preferred polyester polyols a1) are those obtained from the polymerization of:

from 5 to 58, more preferably from 10 to 50, % by weight of one or more of at least difunctional carboxylic acids, C1-C4 alkyl esters thereof and/or anhydrides thereof, from 42 to 95% by weight of at least difunctional hydroxy compounds, more specifically, from 0 to 40, more preferably from 0 to 30, % by weight of difunctional hydroxy compounds from 0 to 49, more preferably from 15 to 45, % by weight of trifunctional hydroxy compounds, and from 0 to 10% by weight of tetrafunctional hydroxy compounds, and from 0 to 50, more preferably from 0 to 30, % by weight of linear or branched monofunctional carboxylic acid and/or monofunctional hydroxy compounds comprising 4 to 20 carbon atoms.

All amounts are relative to the total weight of monomers. More preferably, the total amount of di-, tri- and optionally tetrafunctional hydroxy compound is higher than 42%.

By at least difunctional carboxylic acids, respectively hydroxy compounds, is understood compounds comprising at least 2 acid, respectively at least 2 OH, groups.

According to another preferred embodiment, polyol a1) comprises a mixture of more than one polyol a1), in particular a mixture of at least one (meth)acrylic polyol a1) and at least one polyester polyol a1) as described for the preferred embodiments here above. More particularly, polyol a1) is a mixture a (meth)acrylic polyol having a weight averaged molecular weight Mw of from 1,500 to 4,000 Dalton, more preferably from 1,500 to 3,500 Dalton and, preferably a number averaged molecular weight Mn of from 900 to 2,500 Dalton, more preferably from 900 to 2,000 Dalton and at least one polyester polyol having a weight averaged molecular weight Mw of from 1,000 to 3,000 Dalton, more preferably from 1,100 to 2,800 Dalton and, preferably, a number averaged molecular weight Mn of from 600 to 1,500 Dalton, more preferably from 650 to 1,400 Dalton. Any ratio of polyacrylate and polyester is possible. Preferred is a mixture of from 15 to 85, especially from 15 to 65, % by weight of (meth)acrylic polyol and from 15 to 85, especially from 35 to 85% by weight of polyester polyol, relative to the total amount of polyol a1).

According to another embodiment, polyol a1) is a so-called hybrid polyacrylate polyester polyol, wherein the (meth)acrylic polyol is prepared in situ in the polyester polyol. The (meth)acrylic polyol and polyester polyol are preferably obtained with the same monomers as described here above for the (meth)acrylic polyol and the polyester polyol.

The hybrid polyacrylate polyester polyol preferably has a weight average molecular weight Mw and number averaged molecular weight Mn as described here above. The hybrid polyol preferably has a Mw from 1,500 to 3,500 Dalton. The hybrid polyol preferably has a Mn less than 2,000 Dalton. Preferred hybrid polyacrylate polyester polyol comprises from 15 to 85, especially from 15 to 65, % by weight of (meth)acrylic polyol and from 15 to 85, especially from 35 to 85%, by weight of polyester polyol.

The polyol b) used in the composition according to the invention preferably has a weight averaged molecular weight Mw of at least 700 Dalton, more preferably of at least 1,000 Dalton. The polyol b) used in the composition according to the invention preferably has a weight averaged molecular weight Mw of less than 10,000 Dalton, more preferably less than 9,000 Dalton. The number averaged molecular weight Mn of polyol b) is preferably higher than 600 Dalton, more preferably higher than 1,000 Dalton. The number averaged molecular weight Mn of polyol b) is preferably at most 6,000 Dalton, more preferably at most 5,000 Dalton.

The glass transition temperature Tg of polyol b) is preferably higher than −80° C., more preferably higher than −70° C., most preferably higher than −60° C. The glass transition temperature of polyol b) does usually not exceed 90° C., preferably not 75° C.

The polyol b) used in the composition according to the present invention preferably has a hydroxyl value in the range of 40 to 400 mg KOH per gram of polyol, more preferred in the range of 50 to 300 mg KOH per gram of polyol and most preferred in the range of 80 to 250 mg KOH per gram of polyol b).

The polyol b) may be the same as polyol a1) or may be different. The polyol b) may comprise mixtures of polyols b) as described here above for polyol a1).

The polyurea product a2) is typically prepared by the reaction of a polyisocyanate or its isocyanurate, biuret or uretdione derivative with at least one mono-amine or, alternatively, by the reaction of effectively mono-isocyanates (including diisocyanates that have been selectively reacted at one side) with polyamines. The use of the prefix "poly" for polyisocyanates and polyamines indicates that at least two of the mentioned functionalities are present in the respective "poly" compound. It is noted that when a polyurea product is prepared by the reaction product of amines with a polyisocyanate, it is preferred to prepare a diurea product or a triurea product.

Polyisocyanates are preferably selected from the group consisting of aliphatic, cycloaliphatic, aralkylene, and arylene polyisocyanates, more preferably from the group consisting of substituted or unsubstituted linear aliphatic polyisocyanates (and their isocyanurates, biurets, uretdiones) and substituted or unsubstituted aralkylene and cyclohexylene polyisocyanates. Optionally, the polyisocyanate may contain other functional groups such as for example ether functionalities, ester functionalities or urethane functionalities. The polyisocyanate usually contains 2 to 40 and preferably 4 to 12 carbon atoms between the NCO groups. The polyisocyanate preferably contains at most four isocyanate groups, more preferably at most three isocyanate groups, and most preferably two isocyanate groups. It is even more preferred to use a symmetrical aliphatic or cyclohexylene diisocyanate.

Suitable examples of diisocyanates are preferably selected from the group consisting of tetramethylene-1,4-diisocyanate, pentamethylene-1,5-diisocyanate, hexamethylene-1,6-diisocyanate (HMDI), trans-cyclohexylene-1,4-diisocyanate, dicyclohexylmethane-4,4'-diisocyanate, 1,5-dimethyl-(2,4-[omega]-diisocyanato methyl)benzene, 1,5-dimethyl (2,4-[omega]-diisocyanatoethyl)benzene, 1,3,5-trimethyl (2,4-[omega]-diisocyanato-methyl)benzene, 1,3,5- triethyl(2,4-[omega]-diisocyanatomethyl)benzene, meta-xylylene diisocyanate, para-xylylene diisocyanate, dicyclohexyl-dimethylmethane-4,4'-diisocyanate, 2,4-toluene diisocyanate, 2,6-toluene diisocyanate, and diphenylmethane-4,4'-diisocyanate (MDI).

Further suitable polyisocyanates are preferably selected from the group consisting of polyisocyanates based on HMDI, including condensed derivatives of HMDI, such as uretdiones, biurets, isocyanurates (trimers), and asymmetrical trimers, etc., many of which are marketed as Desmodur® N and Tolonate® HDB and Tolonate® HDT. Particularly preferred polyisocyanates are selected from the group consisting of HMDI, its isocyanurate trimer, its biuret, trans-cyclohexylene-1,4-diisocyanate, para- and meta-xylylene diisocyanate, and toluene diisocyanate.

Most preferably, HMDI or its isocyanurate are selected.

As will be understood by the person skilled in the art, it is also possible to use conventionally blocked polyisocyanates which generate two or more isocyanates in situ, as long as the blocking agent, after splitting, does not prevent the formation of the rheology modification agent according to the invention. Throughout this document the term "polyisocyanate" is used to denominate all polyisocyanates and polyisocyanate-generating compounds. In accordance with a preferred embodiment of the invention the amines used to prepare the polyurea product a2) comprise mono-amines. Many monoamines can be used in combination with the polyisocyanates to create polyurea reaction products. Aliphatic as well as aromatic amines can be used, and primary as well as secondary amines.

Preferably, primary amines are used; of these n-alkylamines and ether-substituted n-alkylamines are particularly useful in accordance with this invention. Optionally, the amines may comprise other functional groups, such as hydroxy groups, ester groups, urethane groups. Preferred monoamines include n-aliphatic amines, especially n-alkylamines such as hexylamine; cyclohexylamine; benzylamine; 3-methoxypropylamine; S-alpha-methylbenzylamine and 2-phenethylamine, as well as mixtures thereof. Specifically preferred polyurea products a2) are the adducts of (derivatives of) HMDI and benzylamine and the adducts of (derivatives of) HMDI and 3-methoxypropylamine. The use of diamines (e.g. ethylenediamine) as component next to mono-amines may also be an option to create high melting point polyureas. The monoamine or part of the monoamine used to prepare the polyurea product a2) can be a chiral monoamine and polyurea products as described in U.S. Pat. No. 8,207,268 are considered to be part of this invention.

The polyurea formation reaction may be carried out in the presence of an inert solvent, for example acetone, methyl isobutyl ketone, N-methyl pyrrolidone, benzene, toluene, xylene, butyl acetate or an aliphatic hydrocarbon such as petroleum ether, alcohols, and water, or mixtures thereof, or in the presence of a binder for the final composition or any other coating formulation component. Here the term "inert" indicates that the solvent does not significantly interfere in the process of polyurea formation, which means that the amount of polyurea formed when solvent is present is at least 80% of the amount produced when no solvent is present.

It will be obvious that if the binder is highly reactive with either the amines or the isocyanate, the binder and that particular susceptible compound cannot be premixed. By the term "highly reactive" is meant here that more than 30% of the susceptible amine or isocyanate reacts with the binder before the amine and the isocyanate are mixed in order to prepare the polyurea product a2).

According to a preferred embodiment of the invention, the polyurea product a2) is prepared in the presence of polyol a1). This can be done by mixing a mixture of the polyol a1) and the isocyanate with the amine or by mixing the isocyanate with a mixture of the polyol a1) and the amine components, or by mixing two mixtures of polyol a1) with amine components and NCO-components, respectively, or by mixing the isocyanate and the amine with the polyol a1) simultaneously.

It is also possible that small amounts of coreactive components are intentionally employed in the preparation reaction of the polyurea product a2) to act as crystallisation modifiers, and more particularly to modify the crystal sizes upon precipitation or the colloidal stability of the resulting crystals. Equally, dispersant and other adjuvants may be present in any of these introduction steps. The preparation of the polyurea products a2) may be carried out in any convenient manner, generally with the reactants being vigorously stirred, in a batch or in a continuous process. Amine components may be added to isocyanate or isocyanate may be added to amine components, whichever is most convenient.

Alternatively the polyurea product a2) can be formed in a separate reaction and mixed with the polyol a1), usually under proper stirring, to form the polyol component a).

The relative molar ratio amine/isocyanate is usually between 0.9 and 1.1, preferably between 0.95 and 1.05.

The particle size of polyurea product a2) is preferably less than 15 μm as determined by ISO 1524.

The polyol component a) according to the invention may optionally comprise one or more of a volatile organic compounds a3). In general, these are compounds with a boiling point at atmospheric pressure of 200° C. or less. Usually, the amount of volatile organic component a3) is less than 64.9% by weight. Preferably, the amount of volatile organic compound a3) relative to the total amount mass of component a) is less than 40%, more preferably less than 35%.

Examples of suitable volatile organic compounds a3) are hydrocarbons or mixtures thereof, such as toluene, xylene, Solvesso 100, Solvesso 150, ketones, terpenes, such as dipentene or pine oil; halogenated hydrocarbons, such as dichloromethane; ethers, such as ethylene glycol dimethyl ether; esters, such as ethyl acetate, ethyl propionate, n-butyl acetate; ether esters, such as methoxypropyl acetate, butyl glycol acetate and ethoxyethyl propionate; alcohols, such as n-butanol and 2-ethylhexanol. Also mixtures of these compounds can be used.

The polyol component a) may further contain other compounds, especially additives or auxiliaries commonly used in coating compositions. These can comprise additives which are commonly used in smaller amounts to improve certain important paint properties, usually less than 5% by weight. These additives may comprise a volatile part comprising a solvent with a boiling point at atmospheric pressure of 200° C. or less and a non-volatile part. Examples of such additives are surfactants, pigment dispersion aids, levelling agents, wetting agents, anti-cratering agents, antifoaming agents, heat stabilizers, light stabilizers, UV absorbers and antioxidants.

The amount of such compounds is usually from 0 to 5, preferably from 0 to 3, and most preferably from 0 to 1, % by weight of the total amount of polyol a1), polyurea product a2) and, if present, volatile organic compound a3).

The polyol component a) preferably does not contain substantial amounts of a polyol different from polyol a1) as defined here above (here after called polyol R), especially a polyol having a Mw higher than 4,000 Dalton and/or an Mn higher than 2,500 Dalton. In particular, the amount of polyol R different from polyol a1) in the polyol component a) according to the invention is less than the amount of polyol a1). The amount of polyol R in the polyol component a) according to the invention is preferably less than 40, more preferably less than 30 and most preferably less than 15, % by weight of the total amount of polyol a1), polyol R and polyurea product a2).

The amount of polyol a1) in the polyol component a) according to the invention is usually from 90 to 99.9, preferably from 90 to 98, % by weight relative to the total weight of polyol a1) and polyurea component a2.

The amount of polyol a1) in the polyol component a) according to the invention is usually from 35 to 95, preferably from 50 to 90, most preferably from 50 to 80, % by weight. The amount of polyol a1) is preferably at least 55, more preferably at least 60, % by weight.

The amount of polyurea product a2) in the polyol component is preferably between 0.3 and 10% by weight, more preferably between 1 to 10% by weight. The amount of polyurea product a2) in the polyol component a) is most preferably at least 2.0% by weight Particularly preferred is a polyol component comprising between 50 and 80% of polyol a1), from 0.3 to 10% of polyurea product a2) and from 15 to 40% of volatile organic compound a3).

The crosslinkable composition according to the invention comprises beside one or more polyol component a) according to the invention as described here above, optionally at least one polyol b) and at least one crosslinker component c). The crosslinkable composition according to the invention preferably comprises at least one polyol b), in particular as described here above. The crosslinkable composition according to the invention more preferably comprises at least polyol b) selected from polyester polyols and (meth) acrylic polyols, polyacrylate polyester polyol hybrids and mixtures thereof.

According to a preferred embodiment, the crosslinkable composition comprises a polyol component a) comprising at least two polyols a1) more particularly a (meth)acrylic polyol and a polyester polyol or a polyol component a) comprising a hybrid polyacrylate polyester polyol or comprises at least two polyol components a), in particular a polyol component a) comprising a (meth)acrylic polyol a1) and a polyol component a) comprising a polyester polyol a1) as described for the preferred embodiments here above. More particularly, a (meth)acrylic polyol having a weight averaged molecular weight Mw of from 1,500 to 4,000 Dalton, more preferably from 1,500 to 3,500 Dalton and, preferably a number averaged molecular weight Mn of from 900 to 2,500 Dalton, more preferably from 900 to 2,000 Dalton and a polyester polyol having a weight averaged molecular weight Mw of from 1,000 to 3,000 Dalton, more preferably from 1,100 to 2,800 Dalton and, preferably, a number averaged molecular weight Mn of from 600 to 1,500 Dalton, more preferably from 650 to 1,400 Dalton. Any ratio is possible. Preferred is a mixture of polyol components a) or polyols a1) such that the total amount of polyol a1) comprises from 15 to 85, in particular from 15 to 65, % by weight of (meth)acrylic polyol and from 15 to 85, in particular from 35 to 85, % by weight of polyester polyol.

The total amount of polyol component a) used in the total composition is usually such that the composition comprises from 5 to 60%, preferably from 5 to 50, and most preferably from 10 to 30, % by weight of polyol a1) relative to the total amount of polyol a1), polyurea product a2), polyol b), crosslinker c), and if present, catalyst d).

The amount of polyol component a) used in the composition according to the invention is preferably such that the weight percentage of polyurea product a2) is in the range between 0.1 and 3% of the total amount of polyol a1), polyurea product a2), polyol b), crosslinker c), and if present, catalyst d), more preferred between 0.2 and 2.5%, most preferred between 0.3 and 2%.

The sum of polyol a1) and b) present in the composition is preferably in the range of 10 to 89, more preferred 20 to 80, most preferred 30 to 70, percent by weight based on the total amount of polyol a1), polyurea product a2), polyol b), crosslinker c), and if present, catalyst d).

The crosslinkable composition preferably does not contain substantial amounts of a polyol component (polyol component R) comprising a polyurea component and a polyol R different from polyol a1) as defined here above, especially a polyol having a Mw higher than 4,000 Dalton and/or an Mn higher than 2,500 Dalton. In particular, the amount of polyol component R different from polyol component a) according to the invention used in the total composition is such that the amount of polyol R) is less than the amount of polyol a1). Preferably, the amount of polyol component R is such that the of polyol R is less than 40, more preferably less than 30 and most preferably less than 15, % by weight of the total amount of polyol a1), polyol R and polyurea product a2).

Crosslinker component c) generally comprises an oligomeric or polymeric compound with at least two functional groups reactable with polyol a) and/or b). Crosslinker c) is preferably selected from amino crosslinkers such as melamine-formaldehyde resins and formaldehyde free based resins, isocyanates or blocked isocyanates or mixtures of amino crosslinkers with (blocked) isocyanates.

Melamine-formaldehyde resins are very well known and have been commercialized since long, and may be obtained from allnex under the tradenames of CYMEL® and SETAMINE®. These melamine-formaldehyde resins, optionally in solution in corresponding organic solvents, comprise products with various degrees of methylolation, degrees of etherification or degrees of condensation (monocyclic or polycyclic). Preferred amino crosslinker resins are sold under the names of CYMEL 202, CYMEL 232, CYMEL 235, CYMEL 238, CYMEL 254, CYMEL 266, CYMEL 267, CYMEL 272, CYMEL 285, CYMEL 301, CYMEL 303, CYMEL 325, CYMEL 327, CYMEL 350, CYMEL 370, CYMEL 701, CYMEL 703, CYMEL 736, CYMEL 738, CYMEL 771, CYMEL 1141, CYMEL 1156, CYMEL 1158, CYMEL 1168, CYMEL NF 3041, CYMEL NF 2000, CYMEL NF 2000A, SETAMINE US-132 BB-71, SETAMINE US-134 BB-57, SETAMINE US-138 BB-70, SETAMINE US-144 BB-60, SETAMINE US-146 BB-72, SETAMINE US-148 BB-70 and mixtures thereof. Particularly preferred are SETAMINE US-138 BB-70, CYMEL 327, CYMEL NF 2000 and CYMEL NF 2000A and mixtures thereof.

Crosslinker component c) can also comprise an isocyanate compound with at least two free —NCO (isocyanate) groups. Isocyanate crosslinkers are well known and have extensively been described in the art. The isocyanate compound is usually selected from aliphatic, cycloaliphatic, and aromatic polyisocyanates comprising at least 2—NCO groups and mixtures thereof. The crosslinker c) is then preferably selected from hexamethylene diisocyanate, 2,4,4-trimethyl hexamethylene diisocyanate, 1,2-cyclohexylene diisocyanate, 1,4-cyclohexylene diisocyanate, 4,4'-dicyclohexylene diisocyanate methane, 3,3'-dimethyl-4,4'-dicyclohexylene diisocyanate methane, norbornane diisocyanate, m- and p-phenylene diisocyanate, 1,3- and 1,4-bis(isocyanate methyl)benzene, xylylene diisocyanate, α,α,α',α'-tetramethyl xylylene diisocyanate (TMXDI), 1,5-dimethyl-2,4-bis(isocyanate methyl)benzene, 2,4- and 2,6-toluene diisocyanate, 2,4,6-toluene triisocyanate, 4,4'-diphenylene diisocyanate methane, 4,4'-diphenylene diisocyanate, naphthalene-1,5-diisocyanate, isophorone diisocyanate, 4-isocyanatomethyl-1,8-octamethylene diisocyanate, and mixtures of the aforementioned polyisocyanates. Other preferred isocyanate crosslinkers are the adducts of polyisocyanates, e.g., biurets, isocyanurates, imino-oxadiazinediones, allophanates, uretdiones, and mixtures thereof. Examples of such adducts are the adduct of two molecules of hexamethylene diisocyanate or isophorone diisocyanate to a diol such as ethylene glycol, the adduct of 3 molecules of hexamethylene diisocyanate to 1 molecule of water, the adduct of 1 molecule of trimethylol propane to 3 molecules of isophorone diisocyanate, the adduct of 1 molecule of pentaerythritol to 4 molecules of toluene diisocyanate, the isocyanurate of hexamethylene diisocyanate (available under the trade name DESMODUR® (E) N3390 or TOLONATE® HDT-LV, TOLONATE® HDT-90, a mixture of the uretdione and the isocyanurate of hexamethylene diisocyanate, under the trade name DESMODUR® N3400, the allophanate of hexamethylene diisocyanate, available under the trade name DESMODUR® LS 2101, and the isocyanurate of isophorone diisocyanate, available under the trade name VESTANAT® T1890. Furthermore, (co) polymers of isocyanate-functional monomers such as α,α'-dimethyl-m-isopropenyl benzyl isocyanate are suitable for use. If desired, it is also possible to use hydrophobically or hydrophilically modified polyisocyanates to impart specific properties to the coating.

Crosslinker component c) can also comprise blocked isocyanates when blocking agents having a sufficiently low deblocking temperature are used to block any of the polyisocyanate crosslinker component c) mentioned above. In that case, crosslinker component c) is substantially free of unblocked isocyanate group-containing compounds and the crosslinkable composition can be formulated as one-component formulation. The blocking agents which can be used to prepare a blocked isocyanate component are well-known to the skilled worker.

Generally, the weight percentage of crosslinker component c) to the sum of polyol a1), polyurea product a2), polyol b), crosslinker component c) and if present catalyst d) in the composition, is between 10 and 89%, preferably between 20 and 80%.

The crosslinkable composition can optionally comprise a catalyst d) for catalysing the reaction between —OH groups of polyol a1) and/or b) and crosslinker c). The person skilled in the art will know that the type of catalyst d) will in general depend on the type of crosslinker component. In one embodiment, catalyst d) is an organic acid, more particularly selected from sulfonic acids, carboxylic acids, phosphoric acids and/or acidic phosphoric esters. Preferred are sulfonic acids. Examples of suitable sulfonic acids are dodecylbenzenesulfonic acid (DDBSA), dinonylnaphthalenedisulfonic acid (DNNSA), para-toluenesulfonic acid (pTSA). An acid catalyst can be also used in blocked form. As a result, as is known, improvement is obtained in, for example, the shelf life of the compositions comprising blocked catalysts. Examples of suitable agents for blocking acid catalysts are amines such as preferably tertiary-alkylated or heterocyclic amines. Blocked sulfonic acid catalysts can for example be blocked DDBSA, blocked DNNSA or blocked p-TSA. This blocking of the sulfonic acid catalysts takes place, for example, likewise via amines such as preferably tertiary-alkylated or heterocyclic amines, such as 2-amino-2-methylpropanol, diisopropanolamine, dimethyloxazolidine or trimethylamine, for example. Alternatively, NH3, optionally dissolved in an organic solvent or in water, can be used to block sulfonic acid catalysts. Also possible is the use of covalently blocked sulfonic acid catalysts. In this case, blocking takes place using covalently bonding blocking agents such as epoxy compounds or epoxy-isocyanate compounds, for example. Blocked sulfonic acid catalysts of these kinds are described in detail in the patent publication U.S. Pat. No. 5,102,961. Catalysts are available, for example, under the trade name CYCAT® (from allnex) or NACURE®, and can be used directly in the composition of the invention.

In another embodiment, the catalyst d) is a metal-based catalyst. Preferred metals in the metal-based catalyst include tin, bismuth, zinc, zirconium and aluminium. Preferred metal-based catalysts d) are carboxylate or acetylacetonate complexes of the aforementioned metals. Preferred metal-based catalysts d) optionally used in the present invention are tin, bismuth and zinc carboxylates, more specifically preferred are dimethyl tin dilaurate, dimethyl tin diversatate, dimethyl tin dioleate, dibutyl tin dilaurate, dioctyl tin dilaurate, and tin octoate, zinc 2-ethylhexanoate, zinc neodecanoate, bismuth 2-ethylhexanoate, bismuth neodecanoate. Also suitable are dialkyl tin maleates, and dialkyl tin acetates. It is also possible to use mixtures and combinations of metal-based catalysts, mixtures of (blocked) acid catalysts and mixtures of metal-based catalysts with (blocked) acid catalysts.

Typically, the catalyst d) is present in the composition according to the invention in an amount between 0 and 10, preferably from 0.001 to 5, more preferably from 0.002 to 5, most preferably from 0.005 to 1, % by weight of the total amount of polyol a1), polyurea product a2), polyol b), crosslinker c) and catalyst d).

The composition according to the invention may optionally comprise one or more of a volatile organic compound e). Suitable volatile organic compounds e) may be selected amongst those described under a3) as described here above. The nature of such volatile organic compound e) can be the same or different from the one used in polyol component a). Usually, the composition according to the invention can be diluted with such volatile organic compounds to a certain application, in particular spray, viscosity. The application viscosity can be determined with a rheometer according to ASTM D4287. In general, the amount of volatile organic compound a3)+e) present in the composition is such to obtain an application viscosity, measured at 25° C., between 20 and 200 mPa·s at a shear rate of 1000 $s^{-1}$, preferably between 40 and 160 mPa·s at 1000 $s^{-1}$, more preferably between 70 and 120 mPa·s at 1000 $s^{-1}$. Preferably, the coating composition according to the invention comprises less than 500 g/l of volatile organic compound a3)+e) based on the total composition, more preferably less than 480 g/l, and most preferably 420 g/l or less at application viscosity.

The polyol component a) or crosslinkable composition according to the present invention can also comprise a reactive diluent. Reactive diluents generally are monomeric or oligomeric liquid compounds comprising at least 1-OH group and are used to reduce the viscosity of the total crosslinkable composition and which can react with crosslinker c). Preferably, reactive diluents are not volatile (having a boiling point higher than 200° C. at atmospheric pressure) and therefore do not contribute to the total volatile organic content of the composition. Optionally, the polyol component a) comprises a reactive diluent in an amount of between 0 to 45% by weight relative to the total amount of polyol a1), polyurea compound a2) and reactive diluent. Optionally, the composition according to the invention comprises a reactive diluent in an amount of between 0 to 20% by weight relative to the total amount of polyol a1), polyurea compound a2), polyol b), crosslinker c), if present catalyst d), and reactive diluent.

In addition to the components described above, other compounds can be present in the crosslinkable composition according to the present invention. Such compounds may be binder resins f) other than polyol a1) or polyol b), optionally comprising reactive groups which may be crosslinked with the aforesaid polyols a1) or b) and/or crosslinkers c). Examples of such other compounds are ketone resins, and latent amino-functional compounds such as oxazolidines, ketimines, aldimines, and diimines. These and other compounds are known to the skilled person and are mentioned, int. al., in U.S. Pat. No. 5,214,086. The amount of such binders is usually less than 30% by weight.

The crosslinkable composition may further comprise other ingredients, additives or auxiliaries commonly used in coating compositions. These can comprise additives which are commonly used in smaller amounts to improve certain important paint properties, usually less than 5% by weight. These additives may comprise a volatile part comprising a solvent with a boiling point at atmospheric pressure of 200° C. or less and a non-volatile part. Examples of such additives are for example surfactants, pigment dispersion aids, levelling agents, wetting agents, anti-cratering agents, antifoaming agents, heat stabilizers, light stabilizers, UV absorbers and antioxidants.

The crosslinkable composition may also be a pigmented composition. In that case pigments and fillers are present in the composition. A pigment normally is a solid component with low solubility in the paint medium, added to the composition to provide color. A filler is normally also a solid component with low solubility in the paint medium, added to the composition to improve other paint parameters such as increasing the volume of the paint or providing anti-corrosion properties.

The non-volatile content of the composition according to the invention at application, especially spray, viscosity, usually referred to as the solid content, is preferably at least 50 weight % based on the total composition, more preferably higher than 50 weight % and most preferably higher than 55 weight % or even higher than 60 weight %. Here, the solid content at application viscosity is calculated by Eq (I).

solid content=Sum of weight of [(polyol a1)+polyurea product a2)+polyol b)+crosslinker c)+catalyst d)+other binder f)+reactive diluent+non-volatile parts of additives)]/ [total weight of sprayable composition-weight of pigments-weight of fillers] (I)

The coating composition according to the invention preferably comprises
  from 0.1 to 10, preferably from 0.2 to 3, more preferably from 0.3 to 2% of weight of polyurea product a2),.from 10 to 89, preferably from 20 to 80, more preferably from 30 to 70, % of weight of polyol a1) plus polyol b),
  from 10 to 89, preferably from 20 to 80, % of weight of crosslinker c),
  optionally, from 0.001 to 10, preferably from 0.002 to 5, more preferably from 0.005 to 1, % of weight of catalyst d) based on the total amount of polyol a1), polyurea product a2), polyol b), crosslinker c), and, if present, catalyst d).

The coating composition preferably comprises from 50 to 95 weight % of a total amount of polyol component a), polyol b), crosslinker c), and if present, catalyst d), based on the total amount of the coating composition.

The present invention therefore also relates to a process wherein at least one polyol component a) according to the invention is added in a coating composition or formulation together with at least one other crosslinkable oligomer or polymer and/or at least one crosslinker.

The crosslinkable composition can suitably be prepared by a process comprising mixing the polyol component a) with polyol b), crosslinker c) and the catalyst d), for a one-component composition. Alternatively, crosslinkable composition can be prepared by a process comprising mixing the polyol component a) with polyol b) and the catalyst d) to form a binder component and mixing said binder component with the crosslinker c) for a two-component composition.

As is usual, in cases where the crosslinker c) is an isocyanate-functional crosslinker, with crosslinkable compositions comprising a hydroxy-functional binder and an isocyanate-functional crosslinker, the composition according to the invention has a limited pot life. Therefore, the composition can be suitably provided as a multi-component composition, for example as a two-component composition or as a three-component composition, wherein the polyol component a) and polyol b) on the one hand and the crosslinker c) on the other hand are parts of at least two different components. Therefore, the invention also relates to a kit of parts for preparing a crosslinkable composition, comprising
  a binder module comprising at least one polyol component a), at least one polyol b) and optionally at least one catalyst d)
  a crosslinker module comprising at least one crosslinker c).

Alternatively, the kit of parts may comprise three components, comprising
  i. a binder module comprising the polyol component a) and polyol b),
  ii. a crosslinker module comprising the crosslinker c), and
  iii. a diluent module comprising a volatile organic diluent, wherein the catalyst d), can be distributed over modules i), ii) or iii), and wherein at least one of the modules optionally comprises the catalyst d).

In cases where the crosslinker c) does not readily react at storage temperature with polyol a1) and/or polyol b), for example when crosslinker c) comprises melamine-formaldehyde resins and/or blocked isocyanate groups, all components a)-d) could be supplied in one part.

The other components of the crosslinkable composition may be distributed in different ways over the modules as described above, as long as the modules exhibit the required storage stability. Components of the crosslinkable composition which react with each other upon storage, are preferably not combined in one module. If desired, the components of the coating composition may be distributed over even more modules, for example 4 or 5 modules.

The crosslinkable composition of the invention provides coatings with improved levelling and appearance, present an excellent sag resistance and provides well-balanced other relevant coatings properties such as hardness, chemical resistance, flexibility and durability.

The crosslinkable composition of the invention can be applied to any substrate. The substrate may be, for example, metal, e.g., iron, steel, tinplate and aluminium, plastic, wood, glass, synthetic material, paper, leather, concrete or another coating layer. The other coating layer can be comprised of the coating composition of the current invention or it can be a different coating composition. The coating compositions of the current invention show particular utility as clear coats, base coats, pigmented top coats, primers, and fillers.

The crosslinkable composition according to the invention is very suitable for use as a clear coat. A clear coat is essentially free of pigments and is transparent for visible light. However, the clear coat composition may comprise matting agents, for example silica based matting agents, to control the gloss level of the coating.

When the crosslinkable composition of the invention is a clear coat, it is preferably applied over a color- and/or effect-imparting base coat. In that case, the clear coat forms the top layer of a multi-layer lacquer coating such as typically applied on the exterior of automobiles. The base coat may be a water borne base coat or a solvent borne base coat. The crosslinkable composition of the current invention is also suitable as pigmented topcoat for coating objects such as bridges, pipelines, industrial plants or buildings, oil and gas installations, or ships. The compositions are particularly suitable for finishing and refinishing automobiles and large transportation vehicles, such as trains, trucks, buses, and airplanes. In general, the crosslinkable composition of the current invention can be applied by spraying, brushing, draw-down or any other method to transfer a composition to a substrate.

Therefore, the invention also relates to a method of providing a coating, preferably a coating for at least a part of a transportation vehicle, more preferably a coating for at least one part of the exterior surface of a transportation vehicle, wherein the method comprises the steps of applying a coating composition according to the invention to at least a part of a transportation vehicle, and curing the applied coating composition, preferably in a temperature range of 5 to 180° C. Those skilled in the art will know that the curing temperature will depend on the type of crosslinker c), and can for example be carried out between 8° and 180° C. or more preferably between 10° and 160° C.

The coating composition according to the present invention was found to be particularly suitable for use in crosslinkable clear coat compositions used in coating processes using different coating layers wherein the number of high bake curing steps is reduced compared to a standard multi-layer coating process. The coating processes with reduced number of high bake curing steps are more economic with regard to paint and energy consumption compared to standard ways of application, in which usually a primer layer is applied on an electrodeposition coating, followed by a first high bake curing step, and subsequent application of an aqueous basecoat layer, flash-off, application of a clear coat layer and second high bake curing. High bake curing is often performed at 140 or even 160° C. In contrast, a process with reduced number of high bake curing steps is often characterized in elimination of the primer layer as well as the first high bake curing step. Instead, in a coating process with reduced number of high bake curing steps, a first aqueous colored layer is applied on a substrate such as a metal, optionally comprising an electrodeposition layer, followed by flash-off, application of an aqueous basecoat layer, another flash-off and application of a clear coat layer followed by one high bake curing step for all layers simultaneously. Here, the flash-off is usually short, typically less than 1 hour, and performed at lower temperature, often up to just up to 80° C.

It was found that polyol component a) is particularly suitable to formulate crosslinkable compositions, more particularly clear coat compositions, when combined with crosslinker c), optionally polyol b), and optionally catalyst d), for use in coating process with reduced number of high bake curing steps, giving good appearance, excellent sag resistance and very good chemical resistance. It was particularly surprising to find that use of polyol component a) according to the invention yielded crosslinkable compositions, more particularly clear coat compositions, with good appearance, excellent sag resistance and very good chemical resistance in a coating process with reduced number of high bake curing steps when combined with polyol b), crosslinker c) of the type of amino crosslinkers and a catalyst d) of the type of blocked sulfonic acids.

The invention therefore also relates to a method of providing a coating, preferably a coating for at least a part of the surface of a transportation vehicle, more preferably a coating for at least one part of the exterior surface of a transportation vehicle, wherein the method comprises the steps of applying a first aqueous colored layer on a substrate, in particular a metal, optionally comprising an electrodeposition layer, followed by flash-off, then application of an aqueous basecoat layer, another flash-off and there after the application of a clear coat layer comprising the coating composition according to the present invention as described here above, followed by one high bake curing step for all layers simultaneously. The flash-off is usually short, preferably at most 1 hour, and performed at lower temperature, often up to just 90° C., preferably up to 80° C. High bake curing is often performed at a temperature of at least 80° C., preferably at least 120° C., most preferably at least 140° C. The high bake curing is preferably at most 180° C.

In this method according to the invention, it is preferred to use a hybrid polyacrylate polyester polyol a1) or at least two different polyols a1), in particular a polyester polyol a1) and a (meth)acrylic polyol a1) as described here above. In this method it is also preferred to use at least two polyols b), in particular a polyester polyol and a (meth)acrylic polyol as described here above. The composition more preferably comprises a mixture of polyols a1) and/or polyols b) such that it comprises from 15 to 65% by weight of (meth)acrylic polyol and from 35 to 85% by weight of polyester polyol based on the total amount of polyol a1) and polyol b).

The present invention further relates to the coatings and coated substrates obtained by using the compositions according to the invention or by the methods according to the invention as described here above. Such coatings combine very good appearance combined with other properties such as hardness, chemical resistance, flexibility and durability and makes them particularly suitable for automotive applications.

EXAMPLES

Tg was determined using Mettler DSC 822E calorimeter according to DEN EN ISO 16805 and ISO 11357. A 7-12 mg sample was first heated well above the Tg at 120° C. This temperature was kept for 5 minutes after which the temperature was brought down to at least 60° C. below the expected Tg in 10 minutes. Subsequently, the sample was heated to 120° C. with a temperature increase of 10° C./minute. The Tg is the temperature at the intersection of the tangent of the baseline and the tangent at the maximum negative slope in a plot of the heat flow versus temperature.

The molecular weight and molecular weight distribution was determined according to ASTM D 3593 by Gel Permeation Chromatography using polystyrene standards, more particularly using size exclusion chromatography. The size-exclusion apparatus used was an Alliance system consisting of a pump, autosampler and He-degasser (Degasys DG-1210 from Uniflows), equipped with a PLgel 5 µm MIXED-C 600×7.5 mm Column and a Plgel 5 µm guard column (50×7.5 mm-Polymer Laboratories). The Column oven (Separations Analytical Instruments) was set at 30° C. Tetrahydrofuran (THF-Extra Dry, Biosolve 206347)+2% acetic acid (Baker 6052) was used as eluent at a flow-rate of 0.8 ml/min.

Carbon disulfide (Backer) was used as a marker. A Waters 410 refractive index was used as detector. The injection Volume was 100 µl at a concentration of 1.5 mg/ml. Polystyrene standards (Polymer Laboratories, Easical PS-1, 2010-0501 (M range 580 g/mol-8,500,000 g/mol) and Easical PS-2, 2010-0601 (M range 580 g/mol-400,000 g/mol)) were used for calibration using a third order polynomial. Software used for data-analysis was Empower (Waters). In a plot of the eluded weight fraction versus the molecular weight thus obtained, the Mn is molecular weight at which 50% of the molecules have eluded and the Mw is the molecular weight at which 50% of the total mass has eluded.

Resin 1: A (meth)acrylic polyol having a hydroxyl value of 132 mg KOH/g (on non volatile content), an acid value of 2.4 mg KOH/g (on non-volatile content), a Mw 2,867 and a Mn 1,303 (GPC, polystyrene standard) and a Tg of –4° C., was prepared from the polymerization of a mixture of acrylic acid, hydroxy ethyl methacrylate, butyl acrylate, butyl methacrylate and styrene. The (meth)acrylic polyol was dissolved in butyl acetate yielding a solution with a non-volatile content of 78% by weight.

Resin 2: A (meth)acrylic polyol having a hydroxyl value was 120 mg KOH/g (on non volatile content), an acid value of 12 mg KOH/g (on non-volatile content), a Mw 8,350 and a Mn 2,640 (GPC, polystyrene standard) and a Tg of –4° C. was prepared from the polymerization of a mixture of methacrylic acid, hydroxy propyl acrylate, butyl acrylate, methyl methacrylate and styrene. The (meth)acrylic polyol was dissolved in Solvesso 100 yielding a solution with a non-volatile content of 70% by weight.

Resin 3: A (meth)acrylic polyol having a hydroxyl value of 92 mg KOH/g (on non volatile content), an acid value of 17 mg KOH/g (on non-volatile content), a Mw 8,300 and a Mn 2,560 (GPC, polystyrene standard) and a Tg of 19° C. was prepared from the polymerization of a mixture of methacrylic acid, hydroxy ethyl methacrylate, butyl acrylate and styrene. This (meth)acrylic polyol was dissolved in Solvesso 100 yielding a solution with a non-volatile content of 65% by weight.

Resin 4: A polyester polyol having a hydroxyl value of 229 mg KOH/g (on non volatile content), an acid value of 4.5 mg KOH/g (on non-volatile content), a Mw 2,138 and a Mn 1,094 (GPC, polystyrene standard) and a Tg of 7° C. was prepared from the polymerization of a mixture of hexahydrophthalic anhydride, isononanoic acid, neopentyl glycol, trimethylol propane and maleic anhydride. This polyester polyol was dissolved in butyl acetate yielding a solution with a non-volatile content of 76% by weight.

Resin 5: A polyester polyol having a hydroxyl value of 104 mg KOH/g (on non volatile content), an acid value of 10 mg KOH/g (on non-volatile content), a Mw 5,000 and a Mn 1,850 (GPC, polystyrene standard) and a Tg of –13° C. was prepared from the polymerization of a mixture of phthalic anhydride, isononanoic acid, stearic acid, glycerol, a glycidyl ester of versatic acid 10, trimethylol propane and maleic anhydride. This polyester polyol was dissolved in xylene yielding a solution with a non-volatile content of 76% by weight.

Resin 6: A (meth)acrylic polyol having a hydroxyl value of 145 mg KOH/g (on non volatile content), an acid value of 3.9 mg KOH/g (on non-volatile content), a Mw 3,415 and a Mn 1,695 (GPC, polystyrene standard) and a Tg of –37° C., was prepared from the polymerization of a mixture of 25 wt % of 2-ethylhexyl acrylate acrylic acid, 30 wt % of hydroxy ethyl acrylate, 25 wt % of butyl methacrylate and 20 wt % of styrene. The (meth)acrylic polyol was dissolved in butyl acetate yielding a solution with a non-volatile content of 72.6% by weight.

Resin 7: A polyester polyol having a hydroxyl value of about 300 mg KOH/g (on non volatile content), an acid value lower than 3 mg KOH/g (on non-volatile content), a Mw 849 and a Mn 610 (GPC, polystyrene standard) and a Tg of –66° C. was prepared.

Example 1: Polyol Component I Comprising a Polyurea Compound

In a 5 litre glass vessel, equipped with a temperature jacket and a stirrer Resin 1 was charged and heated to 30° C. Benzyl amine was then added to the reaction vessel and the mixture was homogenized for 10 to 15 minutes and subsequently cooled with ice-water. The stirrer speed was increased to 750 rpm and hexamethylene diisocyanate diluted with butyl acetate was added. The reaction mixture was stirred for 30 minutes and further diluted with butyl acetate to a solid content of 66.3%. Polyol component I contained 4.6 wt % of polyurea product and 61.7 wt % of polyacrylate polyol. The particle size of the polyurea adduct determined using the ISO 1524 method was found to be less than 15 µm.

Comparative Example 2R: Polyol Component II

Example 1 was repeated except that Resin 1 was replaced by Resin 3. The polyol component II had a solid content of 60% in a mixture of Solvesso 100 and butyl acetate and contained 3.8 wt % polyurea product and 56.2 wt % of polyacrylate polyol. The particle size of the polyurea adduct determined using the ISO 1524 method was found to be less than 15 µm.

Comparative Example 3R: Polyol Component III

Example 1 was repeated except that Resin 1 was replaced by Resin 5 and butylacetate as solvent for dilution was replaced with Solvesso 150 (mixture of aromatic solvents). The polyol component III had a solid content of 52% in a mixture of xylene and Solvesso 150 and contained 2.8 wt % polyurea product and 49.2 wt % of polyester polyol. The particle size of the polyurea adduct determined using the ISO 1524 method was found to be less than 15 µm.

Example 4: Polyol Component IV

Example 1 was repeated except that Resin 1 was replaced by Resin 4. The polyol component IV had a solid content of 71% and contained 4 wt % polyurea product and 67 wt % of polyester polyol. The particle size of the polyurea adduct determined using the ISO 1524 method was found to be less than 15 µm.

Examples 5 and 6 and Comparative Example 7R

Clearcoat compositions having very similar spray viscosity were prepared by mixing the polyol components of Example 1, respectively Comparative Example 2, with Resin 1, respectively Resin 2 and with crosslinkers, catalysts, solvents and additives as shown in Table 1. The solvent composition and the amount of NACURE 5414 catalyst level of each of the individual formulations were optimized previously in order to obtain the best balanced appearance, hardness and xylene resistance. Furthermore, the formulations were composed with respect to the amount of polyurea resin in such a way that the sag resistance of each paint was comparable. Paints were diluted with Solvesso 100 to a constant spray viscosity at 1000 s$^{-1}$.

TABLE 1

*

| Example | 5 | 6 | 7R |
|---|---|---|---|
| Resin 1 | 37.0 | | |
| Resin 2 | | 37.8 | 38.51 |
| Polyol component I of example 1 | 14.1 | 13.1 | |
| Polyol component II of comparative example 2R | | | 11.9 |
| SETAMINE ® US-138 BB-70 | 23.1 | 21.5 | 20.7 |
| Butyl acetate | 2.7 | 2.5 | 0.2 |
| NACURE ® 5414 | 0.55 | 0.5 | 0.25 |
| n-Butanol | 2.9 | 2.7 | 2.6 |
| BYK ® 315N | 0.2 | 0.2 | 0.2 |
| BYK ® 310 | 0.05 | 0.05 | 0.05 |
| Butyl glycol acetate | 2.7 | 2.5 | 2.4 |
| TINUVIN ®123 | 0.5 | 0.5 | 0.5 |
| TINUVIN ®384-2 | 0.5 | 0.5 | 0.5 |
| Xylene | 2.2 | 5.25 | 7.6 |
| Solvesso 100 | 13.5 | 12.9 | 15.0 |
| Solid content (%) | 55.3 | 51.4 | 49.3 |
| Spray viscosity at 1000 s$^{-1}$ (mPa · s) | 113 | 111 | 112 |

*all values are in grams except otherwise specified

SETAMINE® US-138 BB-70 solution of a non-plasticized melamine-formaldehyde resin with very high reactivity and with a solid content of 70%, supplied by allnex.

BYKR 315N is a solution of polyester modified polymethyl alkyl siloxane in 2-phenoxyethanol and 2-methoxy-1-methylethyl acetate.

BYK® 310 is a silicone-containing surface additive.

NACURE® 5414 a polymeric blocked sulfonic acid ester catalyst.

SOLVESSOR 100 is a mixture of aromatic solvents.

The solid content was calculated according to Eq. (I).

Those formulations were applied at room temperature by electrostatic spray application on a commercially available solid color black basecoat. Appearance properties such as the Balance value, Wd, longwave and shortwave were then measured. Hardness, elasticity and xylene and acid etch resistance were determined on clearcoat coatings sprayed by pneumatic application on Gardobond 26S/60/OC panels. Sagging was determined by spraying the formulation pneumatically on a tinplate.

In each case, the coatings were cured during 24 minutes at 140° C.

Wd, longwave and shortwave were measured using a Byk Wavescan Dual. The Balance value was calculated from Wb and Wd values obtained with a Byk Wavescan Dual according to Eq. (II).

$$\text{Balance} = 10 * \frac{Wb - (6\sqrt{Wd} + 4)}{6\sqrt{Wd} + 4} \quad \text{(II)}$$

The sagging limit was determined by spraying the crosslinkable composition on a tinplate panel of 47×30 cm. Halfway over the length, the panel contained 13 holes with a diameter of 1 cm, with a distance of 2.5 cm between the holes. The crosslinkable formulation was sprayed on such a panel with an increasing layer thickness from left to right. The length of each of the tears under the holes and the layer thickness above each hole were determined after curing of the paint. Subsequently, the tear length was plotted versus the coating layer thickness. Here, the layer thickness is reported where the tear length was 20 mm.

Persoz hardness was measured in a climatized room at 23° C., and 55+/−5% relative humidity. Hardness was measured with a pendulum acc. Persoz as described in ASTM D 4366.

Acid etch resistance was determined by placing droplets on 10% H$_2$SO$_4$ aqueous solution on a cured coating. For the duration of 20 mins, 1 drop was placed every minute, in such a way that the first drop was in contact with the coating for 20 min and the last drop for just 1 minute. Subsequently, all acid was washed away by water and the coating was inspected for damage. The time for first damage was reported.

Xylene resistance was determined according to ISO 2812.

Elasticity was determined according to DIN 53156.

Results are shown in Table 2.

TABLE 2

| Example | 5 | 6 | 7R |
|---|---|---|---|
| Balance value (horizontal curing) | 0.3 | 0.7 | 2.7 |
| Wb (vertical curing) | 23.2 | 27.7 | 29.3 |
| Longwave (vertical curing) | 8.6 | 7.6 | 8.9 |
| Shortwave (vertical curing) | 17.1 | 20.6 | 23.8 |
| Persoz hardness @ 40 µm | 279 | 274 | 284 |
| Sagging (tear = 20 mm) (µm) | 48 | 46 | 44 |
| Xylene resistance | Excellent | Excellent | Excellent |
| Acid etch resistance | Very good | Very good | Very good |
| Elasticity | Very good | Very good | Very good |

The data clearly demonstrate that the appearance (as expressed by the combination of the Balance value, Wb longwave and shortwave) of Examples 5 and 6 is much better compared to Example 7R, i.e. especially the Balance value as well as the shortwave is much lower. It is surprising that this improved appearance is accompanied with similar or even improved sag resistance of Example 5 compared to Comparative Example 7R. The other important properties such as Persoz hardness, xylene and acid etch resistance and elasticity are all similar. In conclusion, the formulation of Example 5 provides a much improved appearance with similar or improved other properties, and is therefore a much better-balanced coating.

Examples 8 and Comparative Example 9R

Those examples show the advantages of the current invention used in a process according to the invention containing only one high bake curing step.

In those examples clear coat formulations were prepared as shown in Table 3.

The application spray-viscosity was kept constant at 100 mPa·s at 1000 s$^{-1}$. The paint formulations of Examples 8 and 9R displayed similar sag resistance.

TABLE 3

| Example | 8 | 9R |
|---|---|---|
| Resin 1 | 39.9 | 39.1 |
| Resin 4 | 64.3 | 62.9 |
| Resin 7 | 134.4 | 131.5 |
| Polyol component I of example 1 | 126.9 | |
| Polyol component II of comparative example 2R | | 138.9 |
| Polyol component III of comparative example 3R | | 187.7 |
| Polyol component IV of example 4 | 140.7 | |
| CYMEL ® 327 | 204.7 | 200.4 |
| CYMEL ® NF 2000A | 48.6 | 47.6 |
| CYCAT ® 600 | 3.4 | 3.4 |
| Ammonia (25% in water) | 2.2 | 2.2 |
| BYK ® 315N | 2.5 | 2.4 |
| BYK ® 310 | 0.6 | 0.6 |
| Butyl acetate | 9.5 | 9.3 |
| Solvesso 150 | 59.6 | |
| Solvesso 100 | 43.2 | |
| Xylene | 32.2 | |
| Butanol | 33.2 | 32.5 |
| Butyl acetate | 54.1 | 141.5 |

CYMEL®327 and CYMEL@ NF 2000A are amino crosslinkers supplied by allnex.

CYCAT® 600 is an organic acid catalyst supplied by allnex

Application of the compositions on a substrate using a process with reduced number of high bake curing steps:
 a commercial waterborne base 1 was sprayed, and after a flash-off time of 3 minutes at RT, a black commercial base 2 was applied wet-on-wet. After 7 minutes flash-off at RT, the system was heated to 80° C. for 10 minutes. Subsequently, a clear coat formulation was applied, followed by 10 minutes flash-off at RT and the complete system was subsequently cured at 140° C. for 24 minutes. Appearance properties such as the Balance value, Wb, dullness, DOI and shortwave were then measured using a Byk Wavescan Dual. In addition, Persoz hardness was determined on clearcoat coatings sprayed by pneumatic application on Gardobond 26S/60/OC panels. Results are displayed in Table 4.

TABLE 4

| Example | 8 | 9R |
|---|---|---|
| Solid content (%) | 60.8 | 59.5 |
| Wb | 27.6 | 30.5 |
| dullness | 2.1 | 3.6 |
| Balance value | 0.9 | 1.7 |
| Shortwave | 17.6 | 20.6 |
| DOI | 92.2 | 91.0 |
| Persoz hardness @ 43 μm | 306 | 276 |

The data clearly show that clear coat formulations comprising polyol components according to the invention, result in a much better appearance as expressed by its lower dullness, lower Wb, lower balance value, higher DOI and lower shortwave. The appearance of example 8 was better, despite their similar solid content. Surprisingly, the Persoz hardness of a formulation according to the invention was similar or even higher compared to formulations comprising polyol not according to the invention.

Comparative Example 10R: Polyol Component V

Example 1 was repeated except that Resin 1 was replaced by Resin 6. The polyol component V had a solid content of 73% and contained 5.9 wt % polyurea product and 67.1 wt % of polyacrylate polyol. The particle size of the polyurea adduct determined using the ISO 1524 method was found to be less than 15 μm.

Example 11 and Comparative Example 12R

Clear coat formulations were prepared according to Table 5. Formulations were applied by spraying. The spray viscosity was kept constant at 100 mPa·s at 1000 s$^{-1}$. The sag resistance of the three formulations in Table 5 was similar. Measurements were performed at similar dry layer thickness.

TABLE 5

| Example | 11 | 12R |
|---|---|---|
| Resin 1 | 26.3 | 26.3 |
| Resin 4 | 42.3 | 42.3 |
| Resin 7 | 88.4 | 88.4 |
| Polyol component I of example 1 | 84.2 | |
| Polyol component IV of example 4 | 92.1 | |
| Polyol component V of comparative example 10R | | 166.6 |
| CYMEL ® 327 | 134.7 | 134.7 |
| CYMEL ® NF 2000A | 32.0 | 32.0 |
| CYCAT ® 600 | 2.3 | 2.3 |
| Ammonia (25% in water) | 1.5 | 1.5 |
| BYK ® 315N | 1.6 | 1.6 |
| BYK ® 310 | 0.4 | 0.4 |
| Butyl acetate | 111.7 | 111.7 |
| n-Butanol | 21.8 | 21.8 |

Persoz hardness, Erichsen elasticity and xylene resistance were determined on clearcoat coatings sprayed by pneumatic application on Gardobond 26S/60/OC panels. Gloss 20° was measured on a clear coat sprayed on a commercial black basecoat. Shortwave and balance value were determined after application according to the coating process mentioned in Example 8, using a Byk Wavescan Dual.

TABLE 6

| Example | 11 | 12R |
|---|---|---|
| Solid content at spray viscosity (%) | 63 | 64 |
| Persoz hardness | 306 | 227 |
| Erichsen elasticity (mm) | 7.0 | 6.4 |
| Xylene resistance | good | moderate |
| Gloss 20° | 90 | 89 |
| Shortwave (horizontal curing) | 21 | 24 |
| Balance value (vertical curing) | −0.7 | −1.3 |

The data in Table 6 clearly show that Comparative Example 12R containing Polyol Component V resulted in much softer coatings compared to Example 11 containing Polyol components I and IV according to the invention. In addition, the shortwave (horizontal curing) was higher and the balance was more negative, both indicating that the appearance was worse compared to Example 11. Furthermore, the xylene resistance of the coating obtained from Comparative Example 12R was worse.

In conclusion, Example 11 shows the best appearance combined with other properties on similar or even higher level compared to the Comparative Example 12R. It was particularly surprising that Example 11 showed improved appearance combined with a high gloss value and higher Persoz hardness.

The invention claimed is:

1. A polyol component comprising
   at least 35% by weight of a polyol a1) selected from polyester polyols, (meth)acrylic polyols, and mixtures of hybrids thereof, having a weight averaged molecular weight Mw of from 1,000 to lower than 3,500 Dalton, a number averaged molecular weight Mn of from 600 to lower than 2,000 Dalton, a polydispersity Mw/Mn of from 1.1 to 4, an hydroxyl value between 100 and 250 mg KOH/g of polyol a1), an acid value of less than 8 mg KOH/gram of polyol a1), and a glass transition temperature Tg of from −10 to 75° C., and
   between 0.1 and 10% by weight of polyurea product a2) as rheological agent,
   wherein the polyurea product a2) is the reaction product of an isocyanate component and an amine component, the polyurea product a2) being prepared in the presence of polyol a1) by:
   mixing a mixture of the polyol a1) and the isocyanate component with the amine component,
   mixing a mixture of the polyol a1) and the amine component with the isocyanate component, mixing a mixture of the polyol a1) and the amine component with a mixture of the polyol a1 and the isocyanate component, and/or
   mixing the isocyanate component and the amine component with the polyol a1) simultaneously.

2. The polyol component according to claim 1 wherein polyol a1) has a Mw of 1,000 or more and lower than 3,000 Dalton and a glass transition temperature Tg higher than −5° C. but at most 75° C.

3. The polyol component according to claim 1 wherein polyol a1) is a (meth)acrylic polyol having a weight averaged molecular weight Mw of from 1,500 to lower than 3,500 Dalton and a number averaged molecular weight Mn of from 900 to lower than 2,000 Dalton.

4. The polyol component according to claim 1 wherein polyol a1) is a polyester polyol having a weight averaged molecular weight Mw of from 1,000 to 3,000 Dalton and a number averaged molecular weight Mn of 600 to lower than 1,500 Dalton.

5. The polyol component according to claim 1 wherein polyol a1) is a polyester polyol obtained the polymerization of:
   from 5 to 58% by weight of one or more of at least difunctional carboxylic acids, C1-C4 alkyl esters thereof and/or anhydrides thereof,
   from 42 to 95% by weight of at least difunctional hydroxy compounds, more specifically,
   0 from 0 to 40% by weight of difunctional hydroxy compounds
   0 from 0 to 49% by weight of trifunctional hydroxy compounds, and
   0 from 0 to 10% by weight of tetrafunctional hydroxy compounds, and
   from 0 to 50% by weight of linear or branched monofunctional carboxylic acid and/or hydroxy compound comprising 4 to 20 carbon atoms.

6. The polyol component according to claim 1 wherein the isocyanate component is a polyisocyanate or its isocyanurate, biuret or uretdione derivative and the amine component is at least one mono-amine.

7. The polyol component according to claim 6 wherein the polyisocyanate is selected from the group of hexamethylene-1,6-diisocyanate (HMDI), its isocyanurate trimer or its biuret, trans-cyclohexylene-1,4-diisocyanate, para- and meta-xylylene diisocyanate, and toluene diisocyanate and/or wherein the mono-amine is a primary amine selected from n-aliphatic amines; cyclohexylamine; benzylamine; 3-methoxypropylamine; S-alpha-methylbenzylamine and 2-phenethylamine, as well as mixtures thereof.

8. The polyol component according to claim 1, wherein the amount of polyol a1) in the polyol component is from 50 to 90% by weight, and wherein the polyol component further comprises less than 40% by weight of a polyol R different from polyol a1) relative to the total weight of polyol a1), polyol R) and polyurea compound a2).

9. A crosslinkable composition comprising
   a) at least one polyol component a) according to claim 1,
   b) optionally at least one polyol b) which can be same or different from polyol a1), said polyol b) having at least 2 free —OH groups
   c) a crosslinker reactable with polyols a1) and/or b), and
   d) optionally a catalyst for catalysing the reaction between —OH groups of said polyol a1) and/or
   b) and said crosslinker c).

10. The crosslinkable composition according to claim 9 wherein the polyol b) is present and has a Mw of from 700 to 10,000 Dalton and a glass transition temperature Tg between −80 and 90° C.

11. The crosslinkable composition according to claim 9 wherein polyol b) is selected from polyester polyols and (meth)acrylic polyols, polyacrylate polyester polyol hybrids and mixtures thereof.

12. The crosslinkable composition according to claim 9 wherein crosslinker c) is selected from amino crosslinker resins, isocyanates or blocked isocyanates or mixtures of amino crosslinker resins with (blocked) isocyanates.

13. The crosslinkable composition according to claim 9 having a solid content is at least 50% by weight, at application viscosity.

14. The crosslinkable composition according to claim 9 comprising
   from 0.1 to 10% of weight of polyurea product a2),
   from 10 to 89% of weight of polyol a1) plus polyol b),
   from 10 to 89% of weight of crosslinker c),
   optionally, from 0.001 to 10% of weight of catalyst d)
   based on the total amount of polyol a1), polyurea product a2), polyol b), crosslinker c), and, if present, catalyst d).

15. A method of providing a coating comprising the steps of applying a crosslinkable composition according to claim 9 to at least part of a transportation vehicle and curing the applied coating composition at a temperature in the range of 5 to 180° C.

16. The method according to claim 15 comprising the steps of applying a first aqueous colored layer on a metal optionally comprising an electrodeposition layer, followed by flash-off at a temperature lower than 90° C., then application of an aqueous basecoat layer, another flash-off at a temperature lower than 90° C. and there after the application of a clear coat layer comprising the crosslinkable composition, followed by one high bake curing step for all layers simultaneously at a temperature in the range of 80 to 180° C.

* * * * *